United States Patent [19]
Schlienger

[11] Patent Number: 5,491,584
[45] Date of Patent: Feb. 13, 1996

[54] PIVOTAL, LARGE AREA CINEMATOGRAPHIC SCREEN FOR OPEN-AIR PERFORMANCES

[75] Inventor: Albert Schlienger, Hagenbuch, Switzerland

[73] Assignee: Cinerent Open Air AG, Zollikon, Switzerland

[21] Appl. No.: 260,564

[22] Filed: Jun. 16, 1994

[30] Foreign Application Priority Data

Jun. 20, 1993 [EP] European Pat. Off. .............. 93109835

[51] Int. Cl.$^6$ ................................................. G03B 21/56
[52] U.S. Cl. ........................... 359/443; 359/450; 353/75
[58] Field of Search .............................. 40/560; 359/443, 359/446, 450, 451; 353/79

[56] References Cited

U.S. PATENT DOCUMENTS

| | | |
|---|---|---|
| 1,798,078 | 3/1931 | Geyling et al. . |
| 1,832,821 | 11/1931 | Sponable . |
| 3,640,601 | 2/1972 | Murray ..................................... 350/117 |
| 4,498,734 | 2/1985 | Mihalakis et al. . |

Primary Examiner—Michael L. Gellner
Assistant Examiner—D. P. Malley
Attorney, Agent, or Firm—Barnes & Thornburg

[57] ABSTRACT

The projection wall comprises a screen section carrying the screen and resting on two supports. The screen section can be pivoted by means of hydraulic drives about a first horizontal axis in both directions of rotation. The supports can be folded about a second horizontal axis by actuating hydraulic braces.

Since the screen section can be pivoted in both directions, it is possible to yield to winds coming from the front and the back side. Furthermore, the projection wall can be moved to a horizontal position for assembly and disassembly. The device is easy to install and requires no anchoring.

9 Claims, 3 Drawing Sheets

PIVOTAL, LARGE AREA CINEMATOGRAPHIC SCREEN FOR OPEN-AIR PERFORMANCES

BACKGROUND OF THE INVENTION

1. Field of the Invention

The invention relates to a projection wall for open-air cinemas.

2. Description of the Prior Art

In recent years open-air cinema has become increasingly popular. Especially during film festivals and summer night presentations a large audience is watching films outdoors. This requires large out-door screens. Such screens should be easy to install but still be weather- and storm-proof.

For this purpose it is e.g. possible to use a conventional screen mounted to a scaffolding erected for this purpose. Such a scaffolding must, however, be solid enough to weather even strong storms. This is very difficult since enormous wind pressures can arise when using large screens with a surface of several hundred square meters.

Therefore it is preferred to use a solution where the screen can be lowered. This can be achieved by attaching the screen to a frame and by pivotally anchoring the lower end of the frame in the ground. The screen can be brought into its upright position by ropes, which are attached to its upper end and guided through the upper part of the scaffolding or suitable support columns. This construction leads to problems because the ropes can only exert pulling but no pushing forces. If the screen is to be lowered, a strong wind pressing against the surface of the screen and acting against the desired tilting motion can make the pivoting very difficult if not impossible.

Furthermore, the known solutions require strong anchorings or a heavy ballast for the scaffolding or support columns to secure these structures from being blown over in a storm.

SUMMARY OF THE INVENTION

Hence, it is a general object of the invention to provide a projection wall that reduces these problems. Especially, the projection wall should be easy to install and storm-proof, without requiring a complicated anchoring.

Now, in order to implement these and still further objects of the invention, which will become more readily apparent as the description proceeds, the projection wall is manifested by the features that it comprises a substantially rigid screen section, said screen section being pivotally supported by pivoting means for pivoting said screen section from a substantially vertical operating position into a forward and a backward direction about a horizontal pivot axis.

Because the screen section can be pivoted in both, the backward and the forward directions, it can yield to a wind blowing against any of its surfaces. This reduces the maximum wind pressures that the wall must be able to withstand. Furthermore, the screen can be aligned under an optimum angle in respect to the projector.

Preferably, the screen section can be pivoted in both directions into horizontal positions such that it does not offer a surface to be engaged by the winds of a storm.

If the screen frame is designed to comprise a single torque absorbing traverse providing its torsional stability, the other elements of the screen frame can be very light. When the torque absorbing traverse is located in a lower part of the frame, the center of mass of the wall is lowered, which improves the stability of the device.

In a preferred embodiment the projection wall comprises two lateral supports. Each support comprises an upper and a lower support, the lower support resting on the ground. The upper support holds the screen section and is pivotal in respect to the lower support. In this way it becomes possible to lower the screen to a position where it practically rests with one face on the ground. This is advantageous for securing the projection wall against storms but also for assembling the wall. For reducing the torques and forces during tilting the screen, the pivot axis is preferably located at a distance from and between the upper or lower edge of the screen.

The projection wall can also be provided with a hydraulic drive to move the screen to its operating position while making it possible to lower the screen quickly, especially in an emergency where a storm is coming up and electricity has failed.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENT

Figure 1:
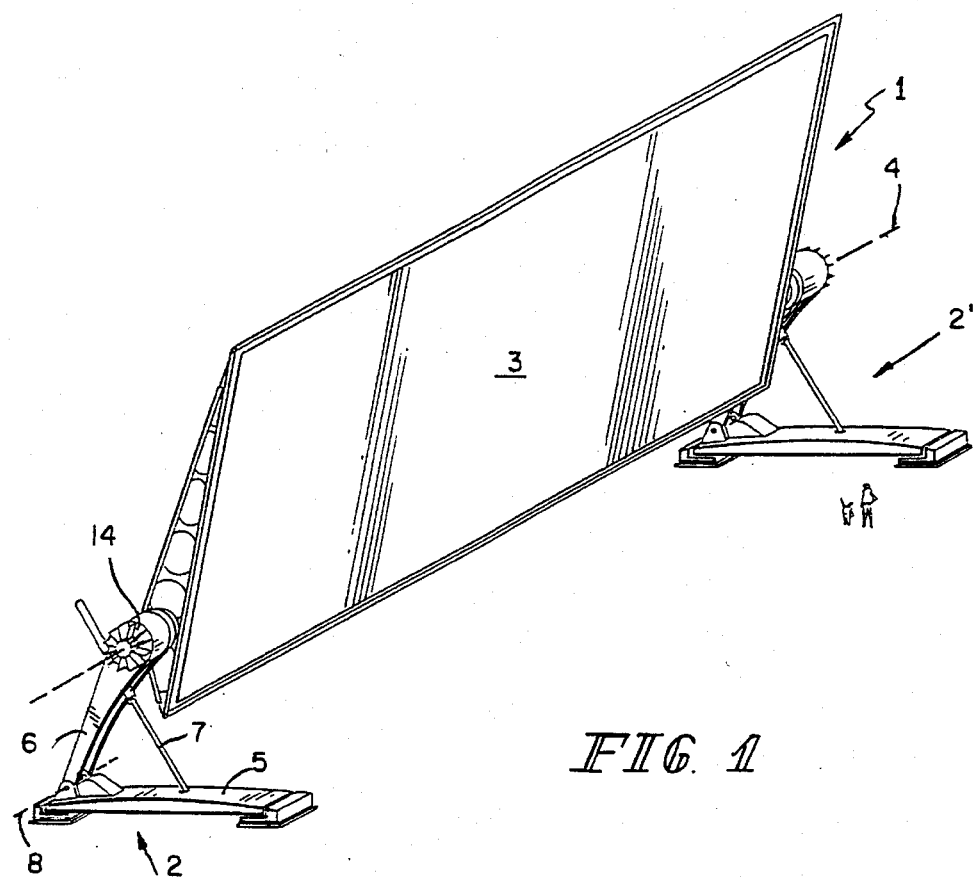
FIG. 1 is a view of the preferred embodiment of the invention in its operating position.

The basic setup of the preferred embodiment of the projection wall can be seen in FIG. 1. This figure shows a large area screen having a surface of e.g. 400 square meters.

The projection wall consists substantially of a screen section 1 and two lateral supports 2 and 2'. The screen section comprises a rigid screen frame, which carries the screen 3. The screen section 1 is pivotal about a pivot axis 4.

Each support 2 and 2' has a lower support member 5, an upper support member 6 and a bracing element 7. The upper support member 6 is can be pivoted about the support axis 8.

Figure 2:
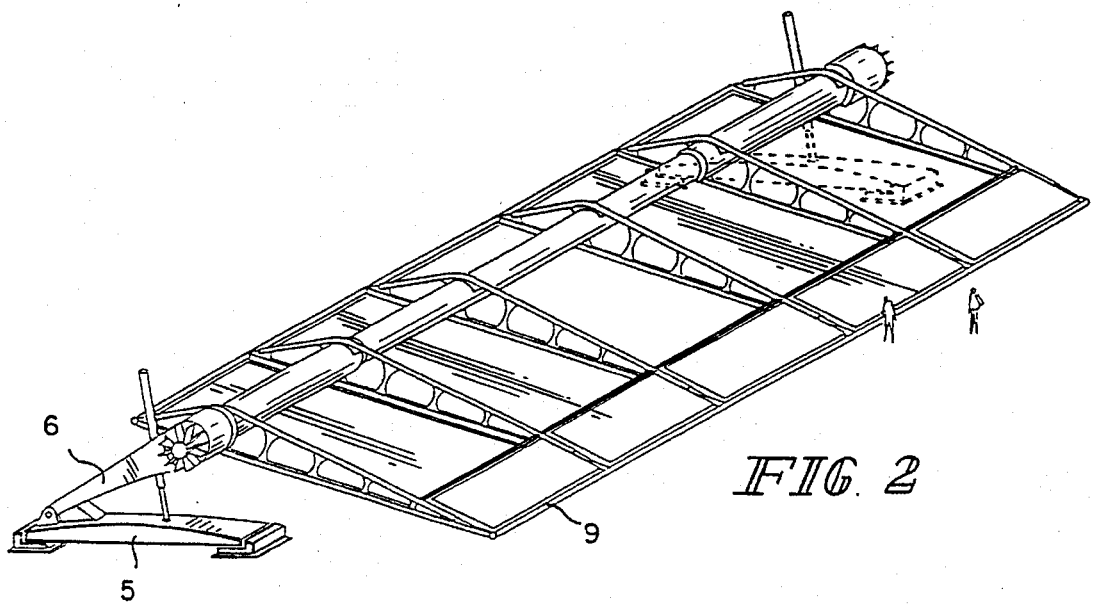
FIG. 2 is a view of the screen of FIG. 1 in its forward horizontal position.

The operation of the screen wall can be seen from FIGS. 1 and 2. FIG. 1 shows the projection wall in its substantially vertical operating position. From this position the screen section 1 can be tilted about the pivot axis 4 in both possible directions of rotation. For being moved into the resting position shown in FIG. 2, the screen section 1 is tilted in a forward direction about axis 4, such that the screen 3 is facing downward for optimum protection. In addition to this tilting movement, the upper supports 6 can be rotated about axis 8 by retracting the braces 7. In this way the screen section can be brought into a nearly horizontal position as shown in FIG. 2 with the screen 3 nearly resting against the ground.

For bringing the screen from the position shown in FIG. 2 into the position of FIG. 1, it is preferred to first actuate the supports 2 in a first phase while simultaneously operating the drive means acting on the pivot axis 4 in such a way that the upper edge 9 of the screen follows the ground and is only lifted when the supports 2 have reached their operating position. The elegant motion resulting from this method has the advantage that the torques acting from the screen section 1 onto the supports 2, 2' is small.

Figure 3:
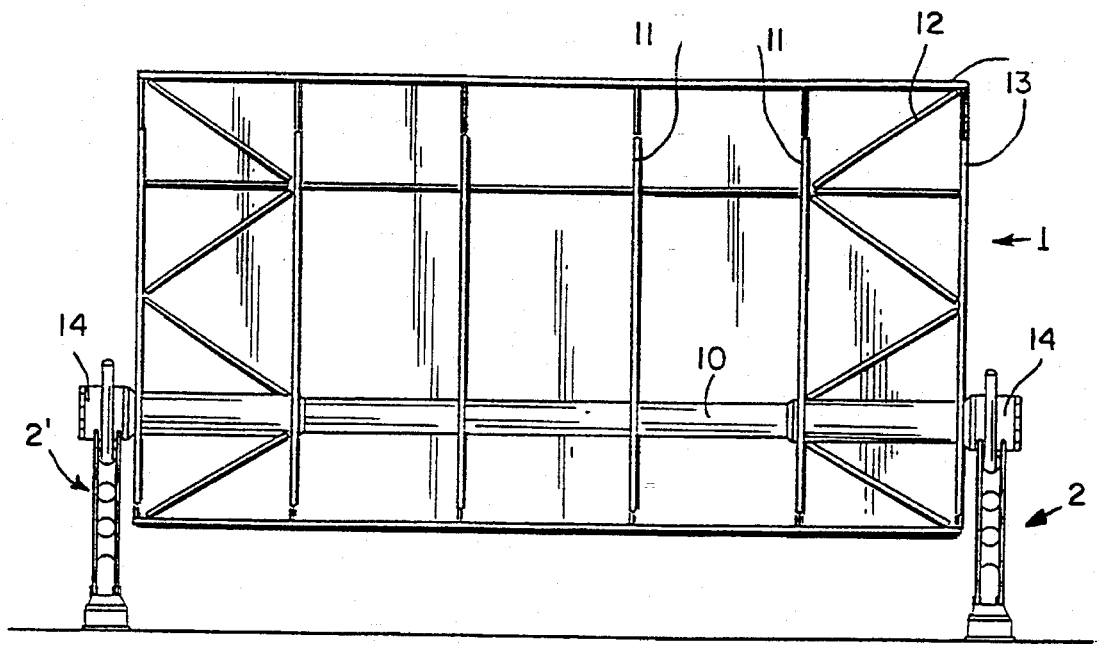
FIG. 3 is a view from back side of the screen.
Figure 4:
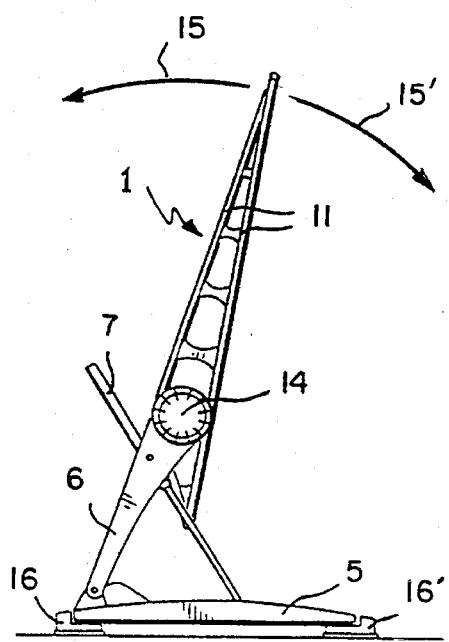
FIG. 4 is a lateral view of the screen.

The constructive details of the device can be seen from FIGS. 3 and 4.

The screen frame comprises a torque absorbing traverse 10, several auxiliary struts and beams 11, 12 and an outer frame 13. The traverse 10 is designed to provide the torsional stability of the whole screen frame. Therefore, the auxiliary struts and beams can be very light, which leads to a center of mass in the lower part of the construction. This improves the stability of the screen wall and reduces the torques acting on axis 4 while tilting the screen.

Each support 2, 2' holds a pivoting drive 14, which is connected to the traverse 10. With the help of these drives the screen section 1 can be tilted in the backward and forward tilting directions 15, 15'.

The braces 7 consist of hydraulic cylinders to adjust the position of the upper support members 6.

The lower support member 5 of each support rests on the supporting feet 16, 16', which guarantee a homogeneous pressure distribution on the ground. The feet comprise rubber bearings that allow limited lateral movements of the lower support members to compensate for a sagging of the structure.

It is not necessary to anchor the projection wall in the ground. Because the center of mass lies close to the axis 4, the wall cannot tilt over in any of its positions. The size of the lower support members 5 is chosen such that they can absorb strong wind forces.

Figure 5:
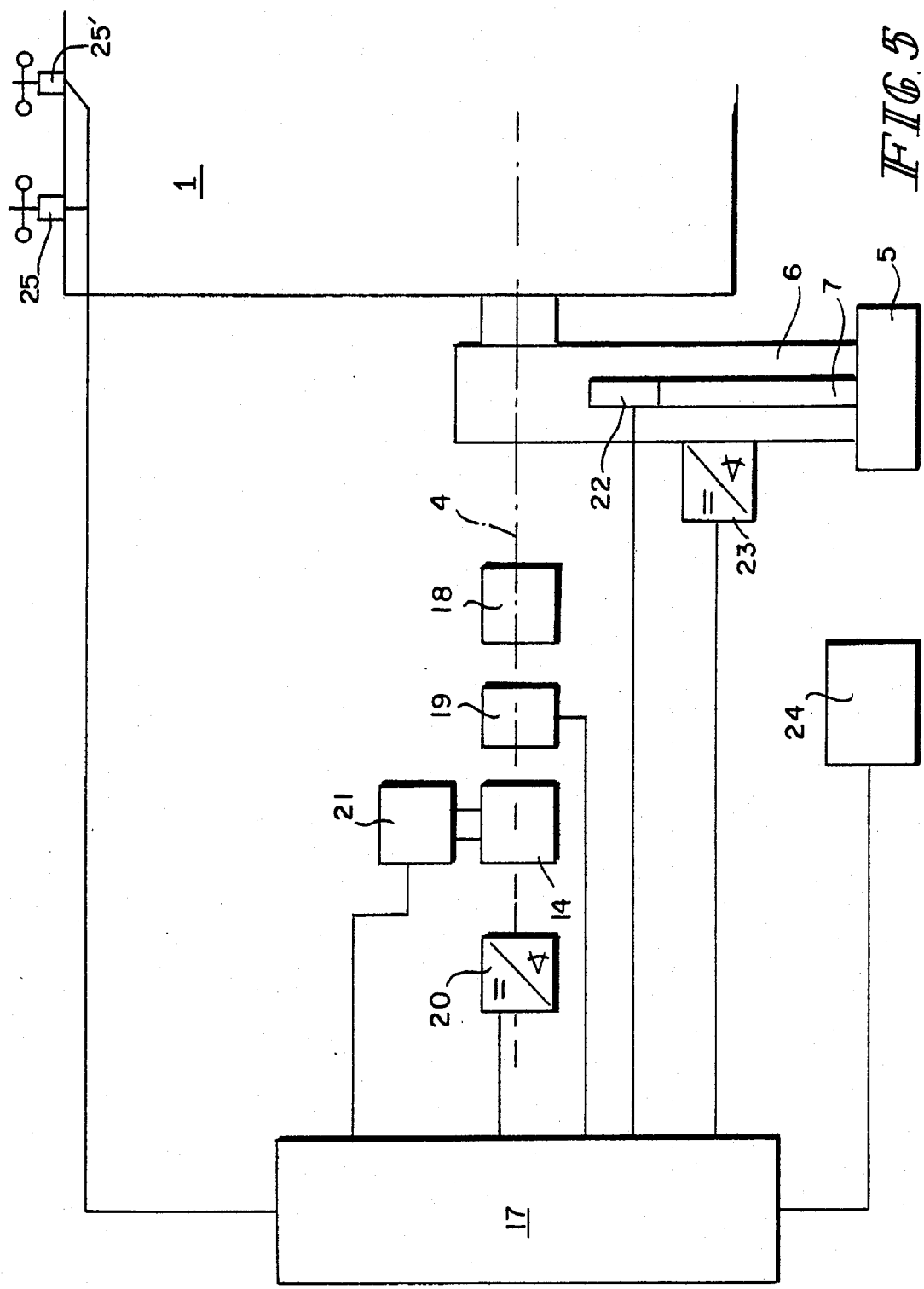
FIG. 5 is a schematic block diagram of the controls of the screen.

FIG. 5 shows the control elements for driving one of the two supports. The other support is provided with similar controls.

A computer control 17 controls the state of both supports and actuates the hydraulic system. The drive of the pivot axis 4 comprises the hydraulic engine 14 with valves 21 and a gearing 18. An electric brake 19 is provided to hold the axis 4. This brake fixes the screen in a selected angular position.

An angular position detector 20 is used to control the angular position at the axis 4.

For safety reasons, the valves 22 of the brace 7 are located directly at its hydraulic cylinder. An angular position detector 23 is used to control the position of the upper support member 6.

A pump 24 generates the operation pressure for the hydraulic elements. Two redundant wind detectors monitor the speed of the wind.

The control elements are designed to automatically tilt the screen into a downward position when the wind becomes too strong. For this purpose the brake 19 is opened automatically when the speed of the wind exceeds e.g. 45 km/h, such that the screen section 1 is only held by the drive 14. If the wind speed increases further (e.g. above 80 km/h), the pressure in the hydraulic fluid of the drive 14 increases as well and opens a security valve when exceeding a maximum pressure. This releases the pivoting drive 14 and the wind can push the screen down without causing damage.

In case of a power failure, the brake 19 is opened automatically such that the screen can still be lowered by hand or by wind pressure.

When the ground in the area of one of the feet 16, 16' is yielding, substantial stress can be created in the structure of the projection wall. Unequal loads on the two braces 7 can be a consequence. Therefore, the braces are also provided with overpressure valves. When the force acting on one of the braces becomes too large, its overpressure valve is opened and the corresponding hydraulic cylinder will retract until the force on the brace becomes sufficiently small. A torsion of the traverse 10 resulting from this movement will be compensated, if necessary, by automatic actuation of the overpressure valves of the pivotal drives 14.

For an accurate positional adjustment of the upper support members, angular position sensors 23 are used. The control unit 17 will adjust the length of the braces 7 automatically until the upper support members are in a desired, parallel position.

Since the projection wall does not require anchoring and since it is able to lift its screen section all by itself, its installation is easy. First, the supports 2, 2' are positioned. Then the traverse 10 is attached to both supports while the upper support members are in their lowest position. The traverse 10 consists of three individual, telescopic elements, which can be transported in a compact form and assembled easily. After installing the traverse 10, the struts and beams 11, 12 and the outer frame 13 are attached to it. Then the screen 3 is mounted on the screen frame.

The assembly of the struts and beams 11, 12, the outer frame 13 and the screen 3 takes place while the supports 2, 2' are in their lowest position, such that all components are at a convenient working height.

The device described above is only one of the possible embodiments of the invention. In other embodiments, the pivot axis can e.g. be located in an upper region, the center or close to the edges of the screen. The supports can also be non-pivotal, if a movement about axis 8 is not required. The number of supports can also be larger than two as well as one.

In all embodiments the screen can yield to winds pressing against any of its two surfaces and can be lowered at any time.

While there is shown and described a presently preferred embodiment of the invention, it is to be distinctly understood that the invention is not limited thereto but may be otherwise variously embodied and practiced within the scope of the following claims.

I claim:

1. A projection wall, especially for open air cinemas, comprising a substantially rigid screen section, said screen section being pivotally supported by pivoting means for pivoting said screen section from a substantially vertical operating position into a forward and a backward direction about a horizontal pivot axis, said screen section comprising a screen frame and a screen surface, said screen surface being held by said screen frame, wherein said screen frame comprises a single torque absorbing traverse.

2. The projection wall of claim 1, wherein said screen section is pivotal into both said directions to substantially horizontal positions.

3. A projection wall, especially for open air cinemas, comprising a substantially rigid screen section, said screen section being pivotally supported by pivoting means for pivoting said screen section from a substantially vertical operating position into a forward and a backward direction about a horizontal pivot axis, and a pivoting drive acting directly on said pivot axis.

4. The projection wall of claim 3, comprising a hydraulic system driving said pivoting drive, said hydraulic system comprising an overpressure valve being released by a wind pressure acting on said screen section exceeding a maximum wind pressure.

5. The projection wall of claim 4, comprising means for braking said pivoting drive.

6. A projection wall, especially for open air cinemas, comprising a substantially rigid screen section, said screen section being pivotally supported by pivoting means for pivoting said screen section from a substantially vertical operating position into a forward and a backward direction about a horizontal pivot axis, at least one support means for supporting said screen section in said pivot axis, each support means comprising an upper support means and a lower support means, said upper support means being connected to said screen section at said pivot axis and being pivotal in respect to said lower support about a support axis, said support axis being parallel to said pivot axis.

7. The projection wall of claim 6, comprising two lateral support means.

8. The projection wall of claim 6, wherein said lower support means extends substantially horizontally and perpendicularly to said support axis, and wherein said projection wall further comprises an adjusting means for adjusting the pivotal position of said upper support means, said adjusting means extending between said lower and said upper support means and being adjustable in length.

9. The projection wall of claim 8, comprising a hydraulic system driving said adjusting means, said hydraulic system comprising an overpressure valve being released by a wind pressure acting on said screen section exceeding a maximum wind pressure.

\* \* \* \* \*